(12) United States Patent
Ono et al.

(10) Patent No.: US 8,238,003 B2
(45) Date of Patent: Aug. 7, 2012

(54) IMAGE INPUT APPARATUS AND AN IMAGE OUTPUT APPARATUS CONFIGURED FOR TRANSFERRING AT LEAST ONE IMAGE FILE OF AN INPUT IMAGE AND A CONVERSION FILE IN DIFFERENT TRANSFER STEPS

(75) Inventors: Mitsuhiro Ono, Tokyo (JP); Akitoshi Yamada, Yokohama (JP); Masao Kato, Kawasaki (JP); Fumihiro Goto, Kawasaki (JP); Tetsuya Suwa, Yokohama (JP); Fumitaka Goto, Tokyo (JP); Yusuke Hashii, Kawasaki (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 11/832,266

(22) Filed: Aug. 1, 2007

(65) Prior Publication Data

US 2008/0037060 A1 Feb. 14, 2008

(30) Foreign Application Priority Data

Aug. 10, 2006 (JP) ................................ 2006-218979

(51) Int. Cl.
  *G03F 3/08* (2006.01)
(52) U.S. Cl. ............ 358/518; 358/1.6; 358/2.1; 358/523
(58) Field of Classification Search ............ 358/1.8–3.3
  See application file for complete search history.

(56) References Cited

U.S. PATENT DOCUMENTS

| | | | |
|---|---|---|---|
| 4,998,801 A | 3/1991 | Shiraishi et al. | 350/162.2 |
| 5,589,946 A | 12/1996 | Shimokoriyama et al. | 386/47 |
| 5,682,203 A | 10/1997 | Kato | 348/340 |
| 6,633,668 B1 * | 10/2003 | Newman | 382/166 |
| 6,636,260 B2 | 10/2003 | Kiyokawa | |
| 6,873,434 B1 * | 3/2005 | Kohler et al. | 358/1.9 |
| 7,209,261 B2 * | 4/2007 | Krueger et al. | 358/1.9 |
| 7,289,141 B2 | 10/2007 | Yamada et al. | 348/207.2 |
| 7,298,523 B2 | 11/2007 | Masumoto et al. | 358/1.6 |
| 2003/0156196 A1 | 8/2003 | Kato et al. | 348/207.2 |
| 2004/0021902 A1 | 2/2004 | Ogiwara et al. | 358/1.15 |
| 2004/0046990 A1 | 3/2004 | Yano et al. | 358/1.15 |
| 2004/0070672 A1 | 4/2004 | Iwami et al. | 348/207.2 |
| 2004/0252335 A1 | 12/2004 | Yano et al. | 358/1.15 |
| 2005/0024497 A1 | 2/2005 | Sakamoto et al. | 348/207.2 |

(Continued)

FOREIGN PATENT DOCUMENTS

JP 7-298077 11/1995

(Continued)

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

A transfer method for transferring data between a digital still camera and a printer in direct communication with each other. The digital still camera stores an image file of an input image and a conversion file including conversion information for carrying out color conversion in a preset color space common to both the digital still camera and the printer. The method includes a first transfer step of transferring from the digital still camera to the printer the conversion file and a second transfer step of transferring the image file from the digital still camera to the printer. The printer carries out color conversion of and outputs the image of the image file transferred in the second transfer step using the conversion information included in the conversion file transferred in the first transfer step.

13 Claims, 17 Drawing Sheets

U.S. PATENT DOCUMENTS

| | | | |
|---|---|---|---|
| 2005/0200869 A1* | 9/2005 | Hayaishi | 358/1.9 |
| 2005/0219555 A1 | 10/2005 | Onuma et al. | 358/1.1 |
| 2006/0044395 A1* | 3/2006 | Aichi et al. | 348/207.2 |
| 2006/0072895 A1 | 4/2006 | Yamada et al. | 386/46 |
| 2006/0098938 A1 | 5/2006 | Goto et al. | 386/46 |
| 2006/0222214 A1 | 10/2006 | Kaneda et al. | 382/115 |
| 2006/0235987 A1 | 10/2006 | Goto et al. | 709/230 |
| 2007/0070368 A1* | 3/2007 | Matsui et al. | 358/1.9 |
| 2007/0133052 A1 | 6/2007 | Yamada et al. | 358/1.15 |
| 2007/0195362 A1 | 8/2007 | Yamada et al. | 358/1.15 |

FOREIGN PATENT DOCUMENTS

| | | |
|---|---|---|
| JP | 11-017970 | 1/1999 |
| JP | 11-219269 A | 8/1999 |
| JP | 2000-190572 | 7/2000 |
| JP | 2006-030422 A | 2/2006 |

* cited by examiner

FIG. 8

```
<?XML version="1.0"?>
<command("DPS_Job")>
<Job>
        <Capability>
                <Quality("1000")/>
                <paper_size("2001")/>
                <paper_type("3002")/>
                <image_type("4000")/>
                <date("5000")/>
                <file_name("2001")/>
                <image_optimize("7001")/>
                <layout("8001")/>
        </Capability>
        <source_profile>
                <profile(00000003)/>
        </source_profile>
        <color_profile>
                <profile(00000002)/>
        </color_profile>
        <printlist>
                <image(00000001)/>
        </printlist>
</job>
```

FIG. 11

```
<?XML version="1.0"?>
<command("DPS_Job")>
<Job>
        <Capability>
                <Quality("1000")/>
                <paper_size("2001")/>
                <paper_type("3002")/>
                <image_type("4000")/>
                <date("5000")/>
                <file_name("2001")/>
                <image_optimize("7001")/>
                <layout("8004")/>
        </Capability>
        <source_profile>
                <profile(00000003)/>
        </source_profile>
        <color_profile>
                <profile(00000002)/>
                <profile(00000003)/>
                <profile(00000004)/>
                <profile(00000005)/>
        </color_profile>
        <printlist>
                <image(00000001)/>
        </printlist>
</job>
```

F I G. 14

```
<?XML version="1.0"?>
<command("DPS_Job")>
<Job>
        <Capability>
                <Quality("1000")/>
                <paper_size("2001")/>
                <paper_type("3002")/>
                <image_type("4000")/>
                <date("5000")/>
                <file_name("2001")/>
                <image_optimize("7001")/>
                <layout("8001")/>
        </Capability>
        <source_profile>
                <profile(00000003)/>
        </source_profile>
        <color_profile>
                <profile(00000002)/>
        </color_profile>
        <printlist>
                <image(00000001)/>
                <image(00000006)/>
                <image(00000007)/>
                <image(00000008)/>
        </printlist>
</job>
```

FIG. 16

```
<?XML version="1.0"?>
<command("DPS_Job")>
<Job>
        <Capability>
                <Quality("1000")/>
                <paper_size("2001")/>
                <paper_type("3002")/>
                <image_type("4000")/>
                <date("5000")/>
                <file_name("2001")/>
                <image_optimize("7001")/>
                <layout("8001")/>
        </Capability>
        <source_profile>
                <save_profile("0001")/>
                <profile(00000003)/>
        </source_profile>
        <color_profile>
                <save_profile("0001")/>
                <profile(00000002)/>
        </color_profile>
        <printlist>
                <image(00000001)/>
        </printlist>
</job>
```

F I G. 17

```
<?XML version="1.0"?>
<command("DPS_Job")>
<Job>
        <Capability>
                <Quality("1000")/>
                <paper_size("2001")/>
                <paper_type("3002")/>
                <image_type("4000")/>
                <date("5000")/>
                <file_name("2001")/>
                <image_optimize("7001")/>
                <layout("8001")/>
        </Capability>
        <source_profile>
                <save_profile("0001")/>
                <profile(00000010)/>
        </source_profile>
        <printlist>
                <image(00000009)/>
        </printlist>
</job>
```

IMAGE INPUT APPARATUS AND AN IMAGE OUTPUT APPARATUS CONFIGURED FOR TRANSFERRING AT LEAST ONE IMAGE FILE OF AN INPUT IMAGE AND A CONVERSION FILE IN DIFFERENT TRANSFER STEPS

BACKGROUND OF THE INVENTION

1. Field of the Invention

The present invention relates to an image input apparatus, an image output apparatus, and a data transfer method for transferring data between an image input apparatus and an image output apparatus, and more particularly, to data transfer between an image input apparatus and an image output apparatus when printing an input image sensed with an image input apparatus typified by a digital camera or a video camera using an image output apparatus typified by a printer.

2. Description of the Related Art

Recently, digital cameras (image input apparatuses) that can sense an image with a simple operation and convert the sensed image into digital image data have come to be widely used. When printing out an image sensed with such a camera and using it as a photograph, ordinarily, it is common to do something like the following: First, the sensed digital image data is sent from the digital camera to a PC (computer). Then, after the image data is processed at the PC, the processed image data is output from the PC to a color printer and printed.

In addition, a color printing system capable of transferring digital image data directly from the digital camera to the color printer without going through a PC and printing an image has also been developed. Hereinafter, such a printing system is referred to as "direct printing". In such a direct color printing system, for matching colors, a technique called color management system (CMS) that matches color reproduction between different image devices is used. CMS is comprised of a device profile that describes the color reproduction characteristics of each image device and a color matching method that carries out color matching.

As one example of a technology that implements this type of color management, a system that carries out color management based on an ICC color profile defined by the International Color Consortium (ICC) is known. This CMS first defines a device-independent hub color space or a profile connection space (PCS) for carrying out color matching, and then implements color management using a source profile that defines color conversion from a device color space to the hub color space/PCS and a destination profile that defines color conversion from the hub color space/PCS to the device color space.

The CMS processing system is composed mainly of two conversion processes. First, based on the source profile, color signal values in the device color space suited to an input side device of an input image are converted into color signal values in the hub color space/PCS. Then, based on the destination profile, the color signal values in the hub color space/PCS are converted into color signals in the device color space suited to an output side device.

In relation to CMS, the following types of technologies have also been implemented. First, using a framework for file specification such as TIFF (Tag Image File Format) file or PDF (Portable Document Format) file, a profile is imbedded in the file. Then, the PC or device carries out color conversion based on the imbedded profile.

At the same time, an EXIF (Exchangeable Image File Format) specification is known. In the EXIF specification, information relating to characteristics of the sensed image and to image sensing conditions is imbedded in each image file, which enables the output device to determine the characteristics of the image during image sensing and the settings used during image sensing for each image file.

Under conditions such as these, there is a desire to make a tint of the output image a color that reflects individual preferences. In this regard, a method that makes it possible to obtain the tint or tone characteristics that a user desires in a printing system for printing a color image has been proposed (for example, JP-2000-190572-A).

In addition, a printing apparatus capable of switching among a plurality of color correction systems (for example, JP-H07-298077-A) and a method for confirming color processing results by displaying on a display unit of the device the results of implementing a plurality of device profiles (for example, JP-H11-017970-A) have also been proposed.

However, to output an image of a color that the user prefers using a simple method that does not go through a PC entails the following problems.

First, in the method for imbedding the device profile as typified by the ICC profile in the image profile, because the device profile must be imbedded in each image file, the size of the image files increases, lengthening the data transfer time as a result. In a device such as a digital camera, which is widely used as an image input device, ordinarily a battery is used as the device's power supply. With the transfer time directly affecting battery life, even a slight reduction in transfer time is desired.

Moreover, with the method of storing the parameters used during image sensing as typified by EXIF, because the user must estimate the image sensing parameters that will produce the desired result during image sensing, the user must estimate the image to be obtained from the settings of the camera, which requires a high degree of skill.

In addition, with the method for reflecting user preferences of JP-2000-190572-A, a method in which the user specifies the desired color from among basic colors is disclosed. However, if the user is not knowledgeable about or does not have experience with color processing, changing such typical colors as red, blue, green, and yellow to give a photograph one has taken oneself the desired tint is a difficult thing to do.

Further, with the printing apparatus capable of switching among a plurality of color correction methods described in JP-H07-298077-A, it is necessary to store the device profile of the input device in the output device. As a result, the color correction method cannot be freely set for all input devices, which limits the user's choices.

Moreover, the method for confirming color processing results by displaying on the display unit of the device the results of implementing a plurality of device profiles described in JP-H11-017970-A has the following defect. Namely, with the display unit mounted on the device such as the digital camera that is widely used as the image input device, the display area is very small and difficult to see clearly, and satisfactory confirmation cannot be made.

SUMMARY OF THE INVENTION

The present invention has been made in consideration of the above situation, and has as its object to reduce the amount of data transferred between an image input apparatus and an image output apparatus while enabling a user to carry out a desired color correction.

According to the present invention, the foregoing object is obtained by providing a transfer method for transferring data between an image input apparatus and an image output apparatus in direct communication with each other, the image input apparatus configured to store at least one image file of an input image and at least one conversion file including conversion information used for carrying out color conversion in a preset color space common to the image input apparatus and the image output apparatus, the transfer method comprising: a first transfer step of transferring from the image input apparatus to the image output apparatus the conversion file for color conversion; and a second transfer step of transferring the image file from the image input apparatus to the image output apparatus, wherein the image output apparatus carries out color conversion of and outputs the image of the image file transferred in the second transfer step using the conversion information included in the conversion file transferred in the first transfer step.

According to the present invention, the foregoing object is also obtained by providing an image input apparatus comprising: a communication unit for communicating directly with an external image output apparatus; a storage unit configured to store at least one image file of an input image and at least one conversion file that includes conversion information for carrying out color conversion in a preset color space common to the image input apparatus and the image output apparatus; a determination unit configured to determine whether or not the image output apparatus in communication with the image input apparatus through the communication unit has a color conversion function configured to implement color conversion of an image of an image file using conversion information included in a conversion file; and a control unit configured to transfer through the communication unit the conversion file and the image file to the image output unit if it is determined by the determination unit that the image output apparatus does have the color conversion function.

Furthermore, the foregoing object is also obtained by providing an image output apparatus comprising: a communication unit for communicating directly with an external image input apparatus; a control unit configured to receive from the image input apparatus through the communication unit at least one image file and at least one conversion file that includes conversion information for carrying out color conversion in a preset color space; a color conversion unit configured to carry out color conversion of an image of the received image file using the conversion information included in the conversion file; and an output unit configured to output an image color-converted by the color conversion unit.

Further features of the present invention will become apparent from the following description of exemplary embodiments with reference to the attached drawings.

BRIEF DESCRIPTION OF THE DRAWINGS

FIG. 8 shows an example of a print job file according to the first embodiment of the present invention;

FIG. 11 shows an example of a print job file according to the second embodiment of the present invention;

FIG. 14 shows an example of a print job file according to the third embodiment of the present invention;

FIG. 16 shows an example of a print job file according to the fourth embodiment of the present invention; and FIG. 17 shows another example of a print job file according to the fourth embodiment of the present invention.

DESCRIPTION OF THE EMBODIMENTS

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

(Description of the Basic Configuration)

First, a description is given of the basic components according to an embodiment of the present invention. It should be noted that, hereinafter, in an environment in which a printer can communicate directly with a digital still camera (DSC), a scheme that prints an image stored on a storage medium in the DSC is referred to as a photo-direct printing scheme.

Figure 1:
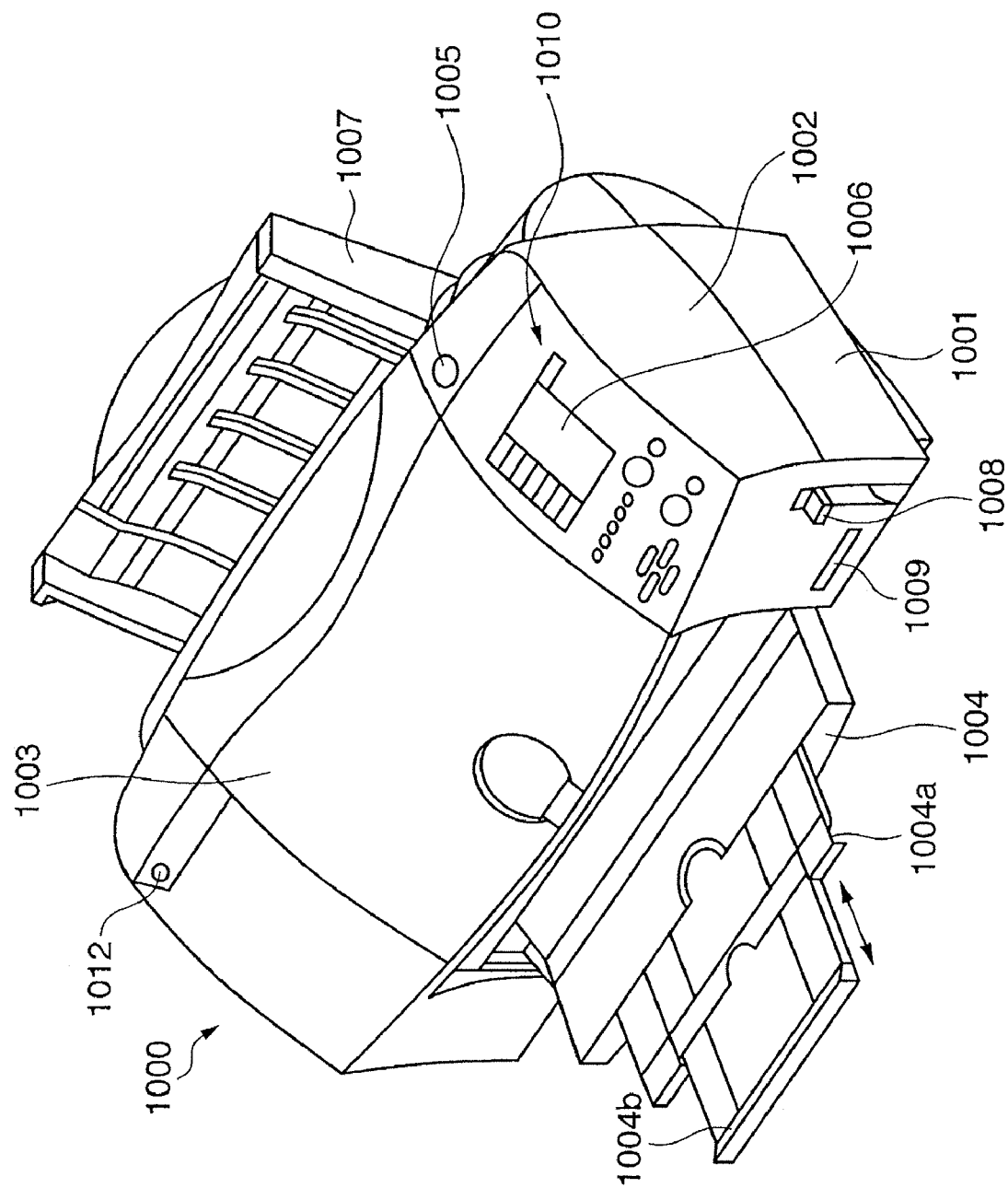
FIG. 1 is an external view of a photo-direct (PD) printer according to an embodiment of the present invention.
Figure 2:
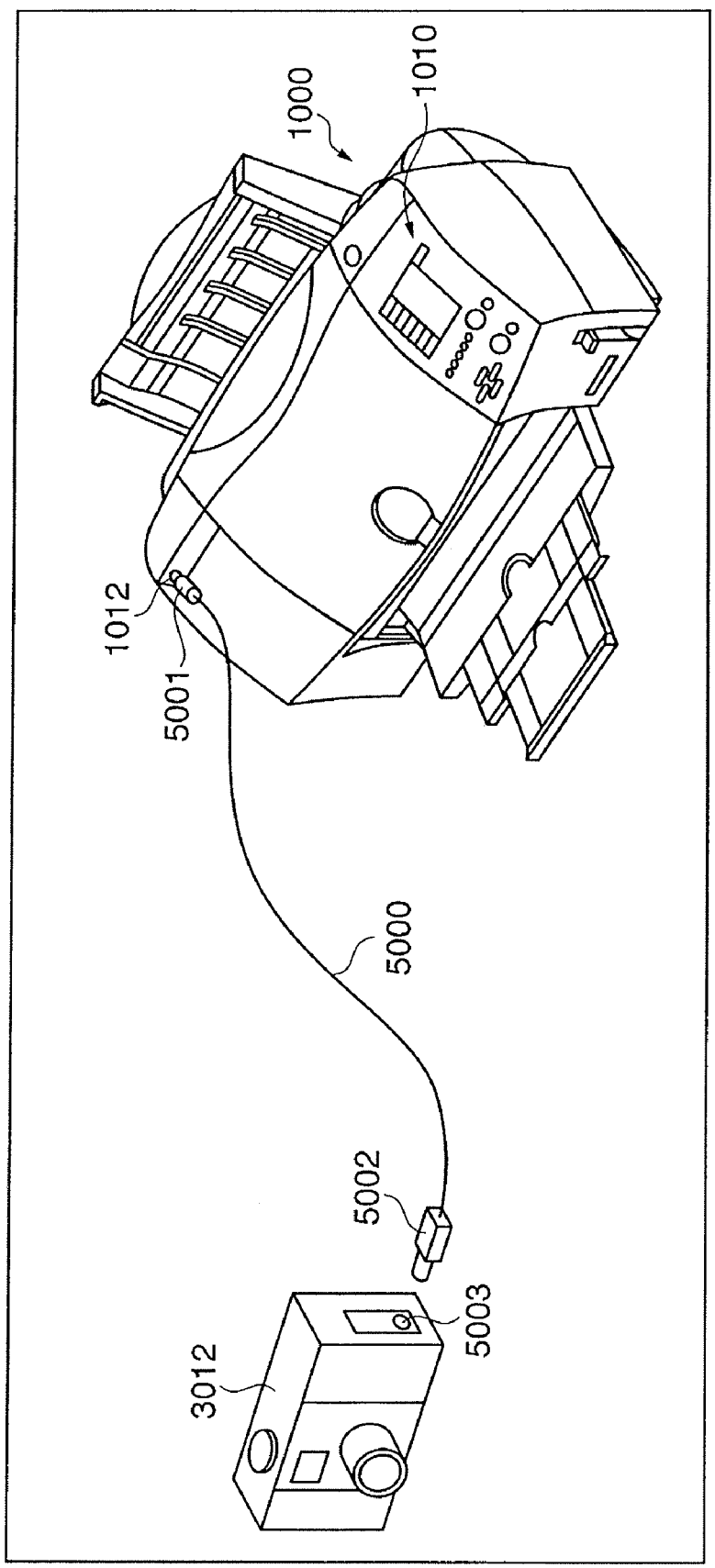
FIG. 2 shows the PD printer and a digital camera of an embodiment of the present invention to connect directly to each other according to the embodiment of the present invention.

FIG. 1 shows an external view of a photo-direct printer (referred to as a PD printer) 1000 of the present embodiment and FIG. 2 shows a DSC 3012 directly connected to the PD printer 1000.

In FIG. 1, the PD printer 1000 has an ordinary printing function that receives data from a host computer (PC) and prints the received data, and a function (DPOF function) that directly reads image data stored on a storage medium such as a memory card and prints the read image data. Further, as described below the PD printer 1000 is also provided with a function that receives image data from the DSC 3012 by communicating directly with the digital camera and prints the received image data.

The body that forms the housing of the PD printer 1000 has external members consisting of a lower case 1001, an upper case 1002, an access cover 1003 and a discharge tray 1004. The lower case 1001 forms approximately the lower half of the PD printer 1000 and the upper case 1002 forms approximately the upper half of the PD printer 1000, respectively.

The combination of these two cases forms a hollow structure having an accommodating space for accommodating mechanisms as will be described later, in the top and front portions of which are formed respective openings.

Further, the discharge tray 1004 is retained along one edge by the lower case 1001 so as to be rotatable thereabout, such that the opening formed in the front of the lower case 1001 can be opened and closed by that rotation. As a result, by rotating the discharge tray 1004 forward so as to open the opening when executing printing, recording sheets such as paper or the like can be discharged therefrom, and moreover, the discharged recording sheets can be sequentially stacked. In addition, two auxiliary trays 1004a and 1004b are contained in the discharge tray 1004. By pulling the trays outward as necessary, the paper support surface area can be enlarged or reduced in three stages to fit the size of the recording sheet.

The access cover 1003 is retained along one edge by the upper case 1002 so as to be rotatable thereabout, such that the opening formed in the top can be opened and closed. Opening the access cover 1003 enables a recording head cartridge, not shown, or an ink tank, not shown, contained in the body to be replaced. It should be noted that, although not shown in particular here, the opening and closing of the access cover 1003 causes a projection formed on a rear surface thereof to rotate a cover operating lever. By detecting the rotation position of the lever with a micro switch or the like, the state of the access cover can be detected.

In addition, a power key 1005 is provided on the top of the upper case 1002 so as to be pressed. Moreover, an operation panel 1010 equipped with a variety of key switches and the like is provided on the upper case 1002. Reference numeral 1007 indicates an automatic feeding unit, which automatically feeds the recording sheets into the apparatus body. Reference numeral 1008 indicates a paper space selection lever, which is a lever that adjusts an interval between a printhead and the recording sheet. Reference numeral 1009 indicates a card slot, into which an adapter capable of accommodating a removable memory card is inserted. As such a memory card, there is, inter alia, a Compact Flash (registered trademark) memory, a Smart Media (registered trademark), a Memory Stick (registered trademark) and the like. After sensing an image with the DSC the memory card is removed and set in the card slot 1009, enabling the sensed image to be read in and printed out.

Reference numeral 1012 indicates a connector for connecting a digital camera described later. Ordinarily, as means for connecting a digital camera to a personal computer (PC), a USB (Universal Serial Bus) is often used. Therefore, in the present embodiment as well, the connector 1012 is a USB interface. However, other communication means may of course be used. Moreover, although in order to simplify the task of connection, the connection to the digital camera is made to be accomplished from the front in the drawing, the present invention is not limited thereto.

At the same time, the PD printer 1000 is also provided with an interface for implementing printing from a personal computer (PC). Ordinarily, after once connected to the PC, the PD printer 1000 usually remains connected thereto, and therefore the interface terminal is provide on the rear surface. The PC connection interface may, for example, be a Centronics Corporation-specification parallel interface, a USB interface, or the like, provided that it at least supports a bidirectional communication function.

FIG. 2 shows connecting the DSC 3012 and the PD printer 1000 to each other according to the present embodiment.

In FIG. 2, a cable 5000 (a USB cable), is provided with a connector 5001 for connecting to connector 1012 of the PD printer 1000 and a connector 5002 for connecting to a connector 5003 of the DSC 3012. It should be noted that, when connecting the DSC 3012 to the PC, not shown, by connecting the aforementioned connector 5001 to the USB connector on the PC, a sensed image can be transferred to the PC.

In addition, the DSC 3012 is constructed so as to be able to output image data saved in its internal memory via the connector 5003. It should be noted that a variety of configurations can be adopted as the configuration of the DSC 3012, such as providing internally a memory as memory means, or providing a slot for attaching a detachable memory. Thus, as described above, by connecting the PD printer 1000 and the DSC 3012 through the cable 5000 shown in FIG. 2, image data from the DSC 3012 can be printed directly by the PD 1000.

Figure 3:
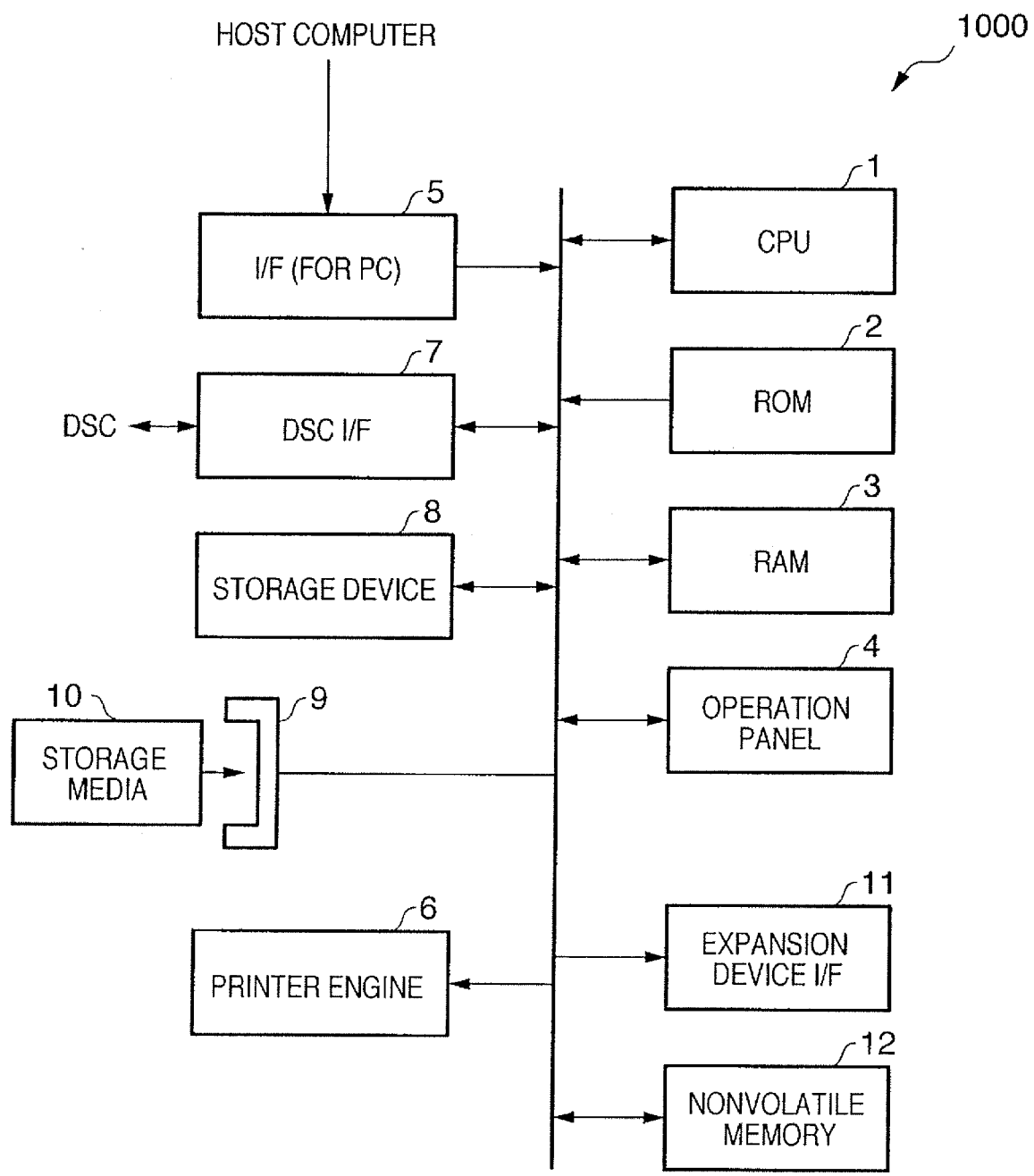
FIG. 3 is a block diagram showing the configuration of a control system of the PD printer according to the embodiment of the present invention.

FIG. 3 is a block diagram of the control system of the PD printer 1000. In FIG. 3, reference numeral 1 indicates a CPU that exercises overall control of the PD printer 1000, 2 indicates a ROM storing operating process procedures (programs) for CPU 1 and fonts, and 3 indicates a RAM used as a work area of the CPU 1. Reference numeral 4 indicates an operation panel (corresponding to 1010 in FIG. 1 and FIG. 2).

Reference numeral 5 indicates an interface for effecting a connection to a PC, and 7 indicates an interface (USB host side) for effecting a connection to the digital still camera. Reference numeral 8 indicates a storage device, which is capable of storing images sent from the image input device. Reference numeral 9 indicates a card interface (I/F) capable of connecting an adapter (PCMCIA) 10 mounting a memory card. The card I/F 9 enables the PD printer 1000 to implement the DPOF function, that is, enables the PD printer 1000 to read a descriptive file relating to a print instruction sensed with a digital camera and stored inside a memory card and to print out accordingly. Reference numeral 6 indicates a printer engine, which, in the present embodiment, is a printer engine that expels ink liquid using thermal energy, although the recording method is not limited thereto. Reference numeral 11 indicates an interface for connecting an expansion device, which, although described in detail later, enables a display unit or the like for the purpose of displaying images as options. Reference numeral 12 indicates a nonvolatile memory. Information stored in this area can be retained even after the power supply is cut off. The difference between the nonvolatile memory 12 and a storage device is access speed and the cost of the device itself. In general, a storage device such as a hard disk is less expensive than a nonvolatile memory. However, because access speed is slow, in the present embodiment large-size files like image files are stored in the storage-device and reference tables and parameter types used in color processing are stored in the nonvolatile memory area.

Figure 4:
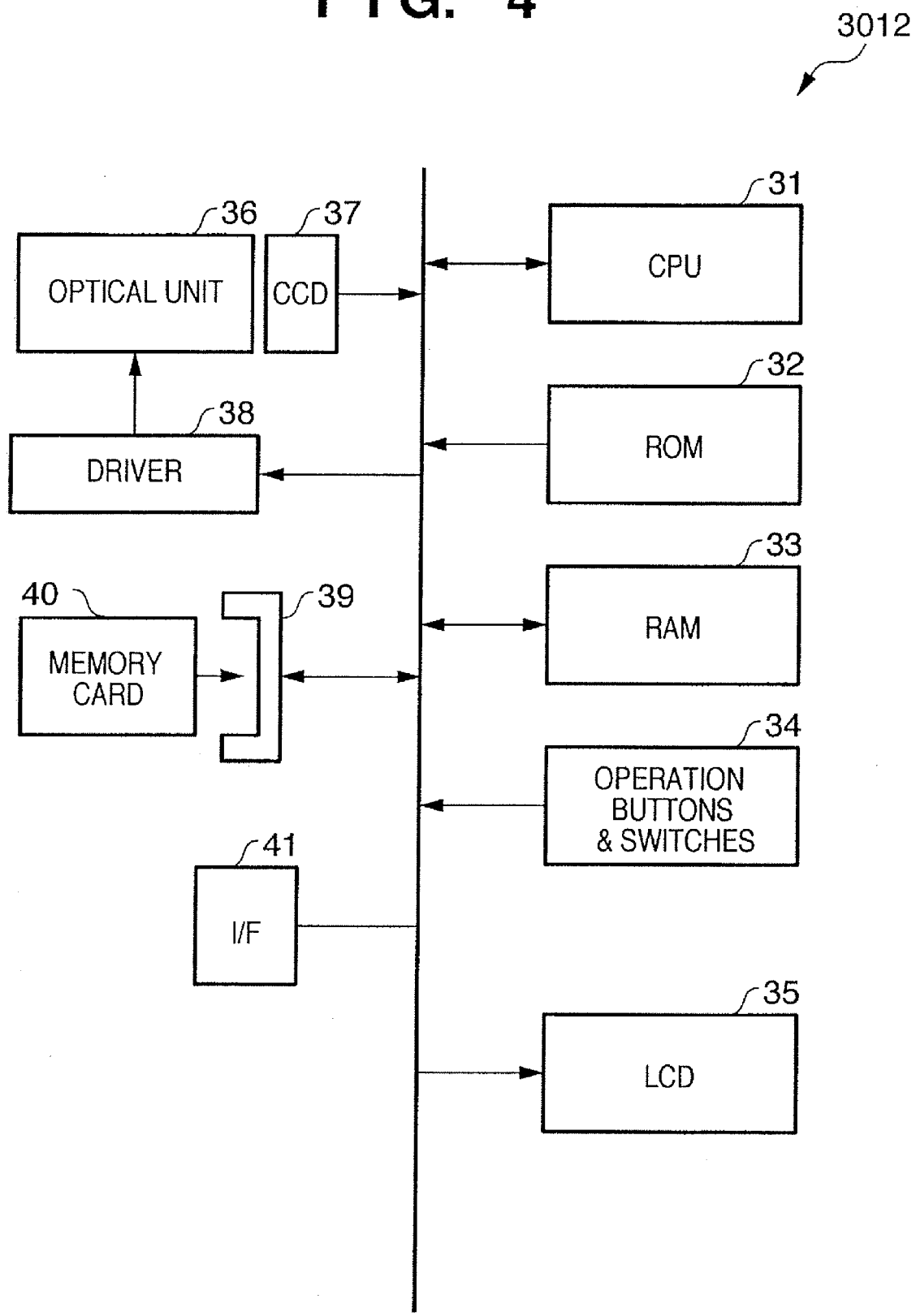
FIG. 4 is a block diagram showing the configuration of the digital camera according to the embodiment of the present invention.

FIG. 4 is a block diagram of the DSC (digital still camera) 3012. In FIG. 4, reference numeral 31 indicates a CPU that exercises overall control of the DSC and 32 indicates a ROM storing operating procedures (programs) for the CPU 31. Reference numeral 33 indicates a RAM used as a work area of the CPU 31 and 34 indicates a group of switches for carrying out various operations. Reference numeral 35 indicates a liquid crystal display (LCD), used to check a sensed image, to display a menu when carrying out various settings, and so forth. Reference numeral 36 indicates an optical unit, composed chiefly of lenses and their drive systems. Reference numeral 37 indicates an image sensing element typified by CCD and CMOS sensors and 38 indicates a driver that controls the optical unit 36 under the control of the CPU 31. Reference numeral 39 indicates a connector for connecting a memory card 40 (such as a Compact Flash (registered trademark) memory card, a Smart Media (registered trademark), and so forth). Reference numeral 41 indicates a USB interface (USB slave side) for connecting to a PC or to the PD printer 1000 of the present embodiment.

It should be noted that, in the PD printer 1000 and the DSC 3012 having the configurations described above, for conventional DPOF printing the usual operations are carried out. In other words, the memory card is removed from inside the DSC 3012 and set in the slot 1009 in the PD printer 1000, and printing is carried out in accordance with the print instruction file stored in the memory card.

Next, a description is given of a situation in which the DSC 3012 and the PD printer 1000 are connected by the cable 5000 and able to communicate with each other directly.

Figure 5:
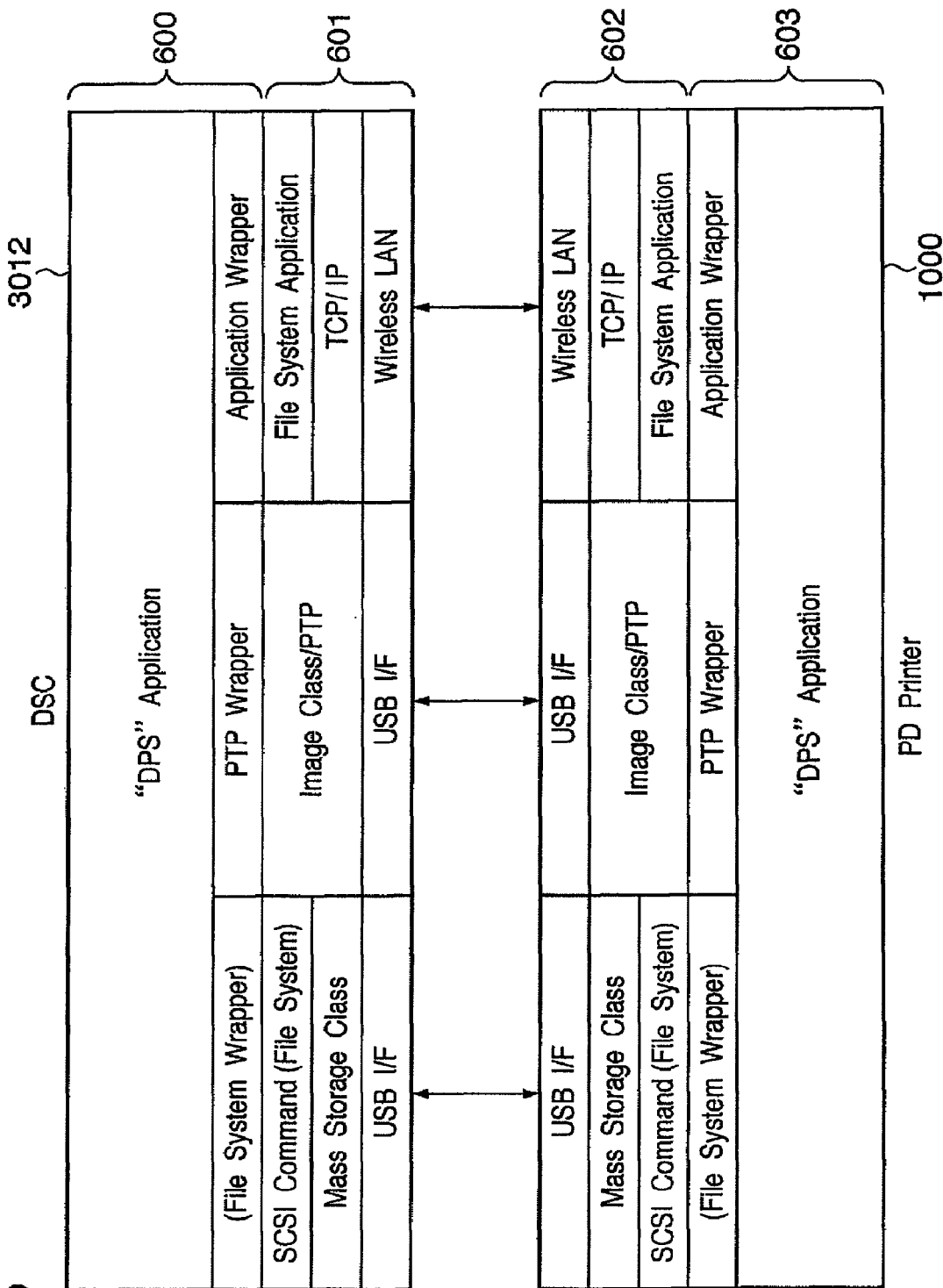
FIG. 5 shows layer structures pertaining to communication between the digital camera and the PD printer according to the embodiment of an the present invention.

FIG. 5 shows connection layers when effecting such direct connection. In FIG. 5, the top side shows layers in the DSC (digital still camera) and the bottom side shows layers of the PD printer.

It should be noted that, in the example shown in FIG. 5, although the communication means SCSI and wireless TCP/IP are also shown, here the description proceeds with respect to typically a USB interface connection.

In the layer structure shown in FIG. 5, in the case of communication by USB well-known Picture Transfer Protocol (PTP) is used. In the present embodiment, the DSC 3012 is connected to the PD printer utilizing a USB interface provided for connection to a PC, and therefore the DSC 3012 functions as the USB slave and the PD printer 1000 functions as the USB host. In other words, when connected, control as a PD printing system rests with the PD printer 1000 side.

Figure 6:
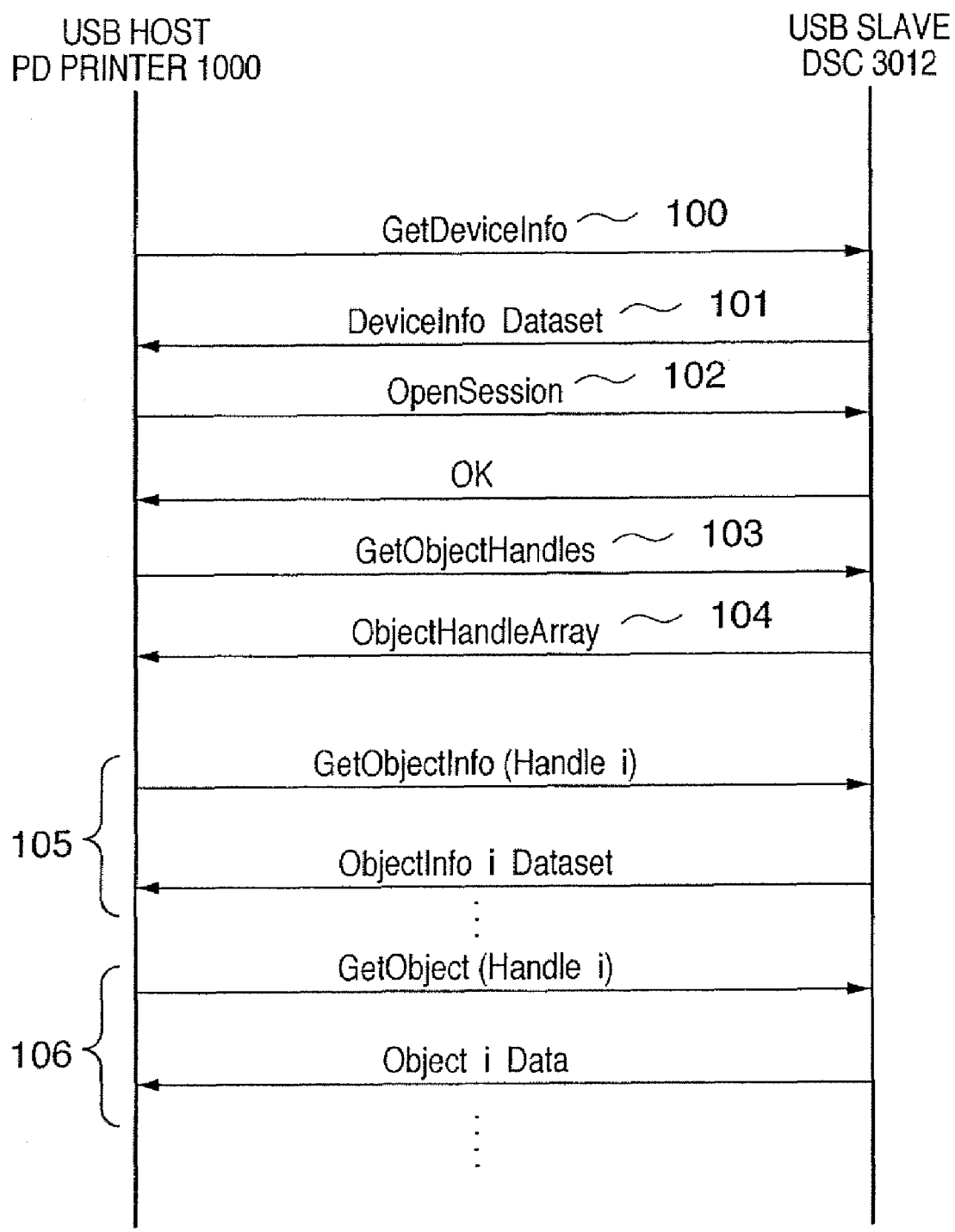
FIG. 6 shows a connection sequence using common PTP protocol when connecting the digital camera and the PD printer according to the embodiment of the present invention.

FIG. 6 shows the general communication procedure using PTP. To facilitate comprehension, in the case of the present embodiment the USB host is the PD printer 1000 and the DSC 3012 is the USB slave, as is also shown in FIG. 6.

First, a PTP command GetDeviceInfo is transmitted from the PD printer 1000 to the DSC 3012. In this procedure, because the PD printer 1000 does not know what the connected device is, the PD printer 1000 queries the connected device (procedure 100). In response, the DSC 3012 transmits (reports) to the PD printer 1000 information relating to the DSC 3012 by DeviceInfo Dataset (procedure 101).

Next, in procedure 102, by PTP command OpenSession the DSC 3012 is allocated as a resource, and handles are assigned to data objects as necessary, procedures for carrying out special initialization are started, and so forth.

Next, a handle is requested of the DSC 3012 (procedure 103) because the PD printer 1000, in order to identify the unknown objects that the DSC 3012 has (sensed image, script, and so forth), requests unique numbers assigned to the objects that the DSC 3012 has. To this request, a handle list stored in the DSC 3012 is returned (procedure 104).

As a result of the foregoing, the PD printer 1000 determines how many objects (DPOF print instruction files (hereinafter "DPOF files"), sensed image files, image processing parameter files) the DSC 3012 is holding.

Thereafter, when the PD printer 1000 queries what an $i^{th}$ object is, attribute information relating to the $i^{th}$ object (whether the object is an image, or text such as script, etc.) is requested with GetObjectinfo(i), and the results are received as Objectinfo i Dataset (procedure 105).

If the attribute is image data, then using a handle that indicates that image data the PD printer 1000 issues a GetObject, as a result of which the image data can be obtained by receiving Object i Data (procedure 1061).

In addition, files other than image files that the DSC 3012 holds can also be obtained with the same procedure.

First Embodiment

Next, a description is given of a first embodiment of the present invention using the DSC 3012 and the PD printer 1000 having the configurations described above.

Here, a description is given of a method that uses a color profile in which are stored settings relating to color processing carried out by the PD printer 1000 that is saved as a separate file from the images on the DSC 3012. Doing so eases the burden of storing the color profile on the DSC 3012 and enables the same color conversion to be requested of the PD printer 1000 by multiple digital still cameras.

Figure 7:
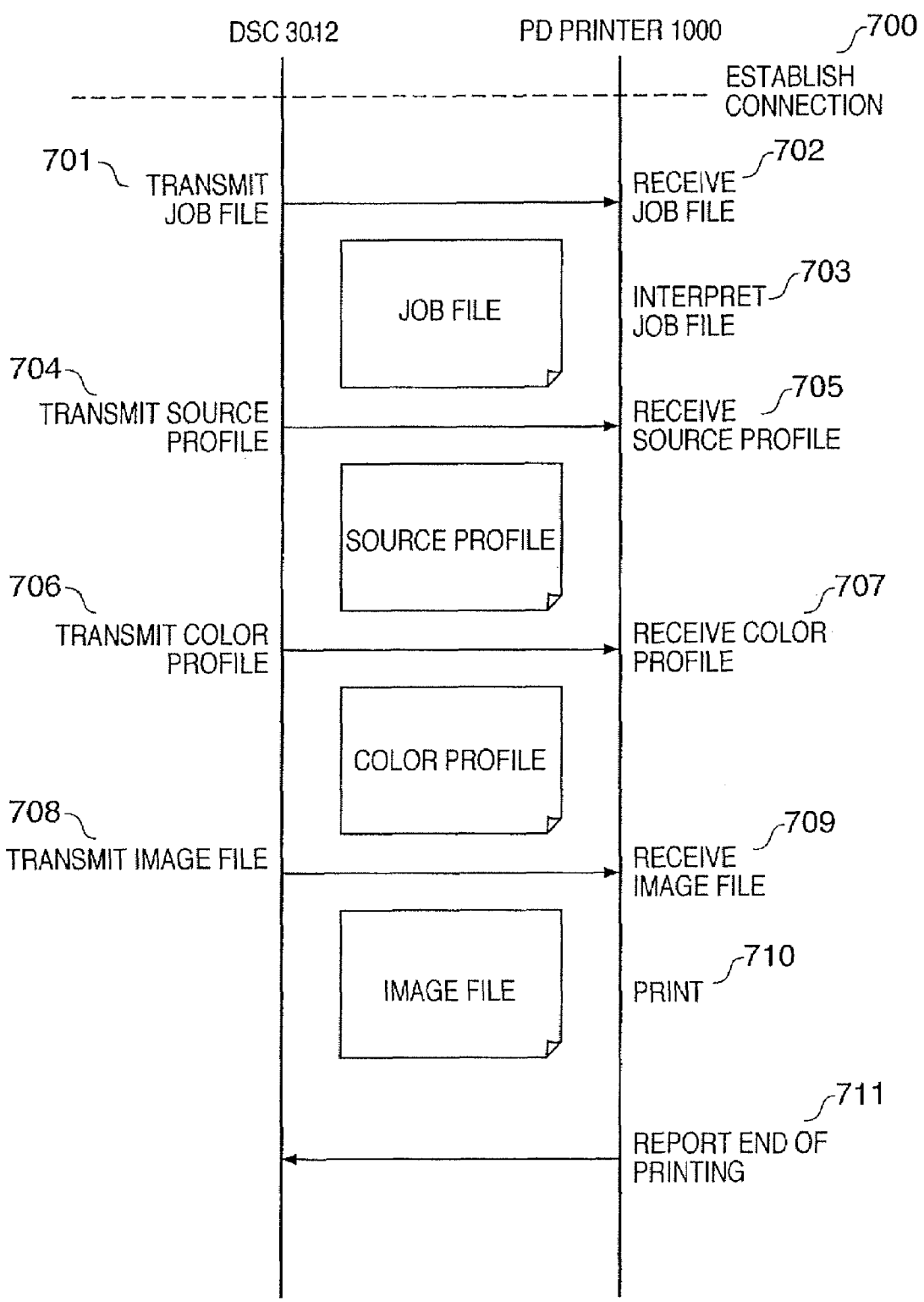
FIG. 7 shows an overall processing procedure of the digital camera and the PD printer according to a first embodiment of the present invention.

A description is given first of the overall processing flow using FIG. 7.

First, after the user physically establishes a connection between the DSC 3012 and the PD printer 1000, the DSC 3012 and the PD printer 1000 establish a logical connection (procedure 700). At this point, between the DSC 3012 and the PD printer 1000, it is confirmed whether or not a profile for color conversion and an image file described in the first embodiment can be handled independently. This confirmation step is achieved in two stages.

Step 1) Whether or not color conversion processing can be carried out based on a profile described later at the PD printer 1000.

Step 2) If the color conversion processing can be carried out, whether a color conversion instruction profile is to be transmitted and received as a separate file or in a form in which it is imbedded in the image file.

If both conditions confirmed in steps 1 and 2 described above are satisfied, the processing of the first embodiment can be carried out. If both conditions are not satisfied, conventional PD printing is carried out. The PD printer 1000 of the first embodiment can carry out color conversion processing based on a profile (YES at step 1), and handles the profile as a separate file from the image file and does not imbed it in the image file (NO at step 2).

Next, the user sets the image file to be printed, the color profile, output medium size, output medium type, whether or not to print the date and so forth, and confirms printing. In accordance with these user operations, the DSC 3012 creates a job file and transmits it to the PD printer 1000 (procedure 701). It should be noted that, in the PD printing system of the first embodiment, as described above the PD printer 1000 exerts active control, and therefore file reception of the job file and the like means that the PD printer 1000 actively acquires the files from the DSC 3012. However, at this point the description concentrates solely on the movement of the files.

The PD printer 1000 receives the job file (procedure 702) and interprets it (procedure 703). Details of the job file are described later.

Next, the PD printer 1000 receives from the DSC 3012 three files described in the job file: A source profile (procedures 704, 705), a color profile (procedures 706, 707), and an image file (procedures 708, 709). The PD printer 1000 carries out image processing described below in accordance with the above-described job file, source profile, color profile, and image file, and carries out a printing operation (procedure 710).

After the printing operation ends, the PD printer 1000 informs the DSC 3012 of the end of printing (procedure 711) and ends the series of printing operations.

Using FIG. 8, a description is now given of the content of the print job file that is transmitted from the DSC 3012 to the PD printer 1000.

The job file is a user print instruction file created using a user interface of the DSC 3012. The content of the job file consists generally of four parts. The first is capability information such as the type and size of the output medium. The second is a file that describes information for converting color information dependent on the digital camera device of the image sensed with the digital camera into a general-purpose color space (hereinafter referred to as a "source profile"). The third is a file that describes information for color conversion (hereinafter referred to as a "color profile"). The fourth is the image file. These four files are saved as separate files in the DSC 3012, and therefore information indicating handles is written in the job file.

In the color profile are written instructions relating to color conversion. In the first embodiment, a color profile is provided that is different from that which is in general referred to as a source profile.

In the source profile of the ICC profile is a description of a method for converting a sensed image into a general-purpose, standard color space. In other words, the image sensed with the DSC 3012, if it is a color image, is expressed as an aggregate of pixels in which each pixel has multiple tone signals of RGB. However, the RGB signals are expressed in the color space of the DSC 3012, which is different from the color space that the PD printer 1000 can interpret. As a result, a difference arises between the colors the DSC 3012 intends and the colors the PD printer 1000 reproduces. Accordingly, in the color profile is described conversion from the color space sensed with the DSC 3012 to a standard color space that both the DSC 3012 and the PD printer 1000 can use in common.

In addition, the color profile, which is provided separately from the source profile, is also designed to reflect color conversion that reflects user preferences as well as color conversion for the purpose of correcting a sensed image, and defines the conversion of color from RGB space to RGB space. The purpose of the color profile is to reflect user preferences and to correct errors during image sensing. Here, "user preferences" includes, for example, color preference as to whether to print skin color in a lighter tone or conversely in a darker tone, or whether to print an image as if it is sensed under a white light source or under a light source like an incandescent light source. Moreover, "to correct errors during image sensing" means correcting when, because of the camera settings and image sensing environment, the sensed image is not what was intended. For example, if a portion intended to be taken is whited-out due to improper aperture or ISO adjustment, the white-out of the target portion can be corrected by correcting the tone.

The color profile is an independent file, and therefore a general-purpose profile typified by the ICC profile described above can be used as well, which allows a profile that is common to another DSC to be used, and also allows a unique color profile to be created using a PC or the like and stored in the DSC. Further, since the color profile is also an independent file in the DSC 3012 internal file structure, it need not be imbedded in every sensed image and therefore the DSC 3012 internal memory is not over-consumed.

The PD printer 1000, having received the job file, acquires the information for color conversion necessary for printing and the image file information from the DSC 3012.

A description is now given of a method for managing the source profile and the color profile inside the DSC 3012. When these two types of profiles are imbedded in the sensed image, the source profiles and color profiles to be managed increase as the number of images sensed increases. However, the purpose of the source profile is to convert the device-dependent color information of the DSC 3012 into information in a standard color space capable of being utilized by multiple devices. As a result, since the color space of the DSC 3012 does not change with the sensed images, there is no need to manage the source profile for each sensed image. Consequently, it is sufficient to manage the source profile at each circumstance under which the color space of the DSC 3012 does change.

The circumstances under which the color space of the DSC 3012 changes include the model of DSC, the individual unit, the image sensing mode, and the like. Accordingly, it is sufficient to store and manage the source profile for each model, or with each individual unit or image sensing mode. Similarly, user preference color settings should be determined not according to the sensed image but according to at least the same image sensing environment and image sensing subject. Consequently, there is no need to manage the color profile for every sensed image. From the foregoing, it is clear that, by managing the number of images sensed, the source profile, and the color profile independently of the sensed images, the source profiles and color profiles to be managed do not increase with the number of images sensed. Consequently, the memory capacity for holding the images and the source profiles and color profiles also need not be increased.

Further, with regard to user preferences, the ability to reflect such preferences in even a single sensed image, for example, if brighter is preferred, or if darker is preferred, is desired. Consequently, the profiles may be managed so a brighter color profile or a darker color profile is produced, independent of the sensed image.

Figure 9:
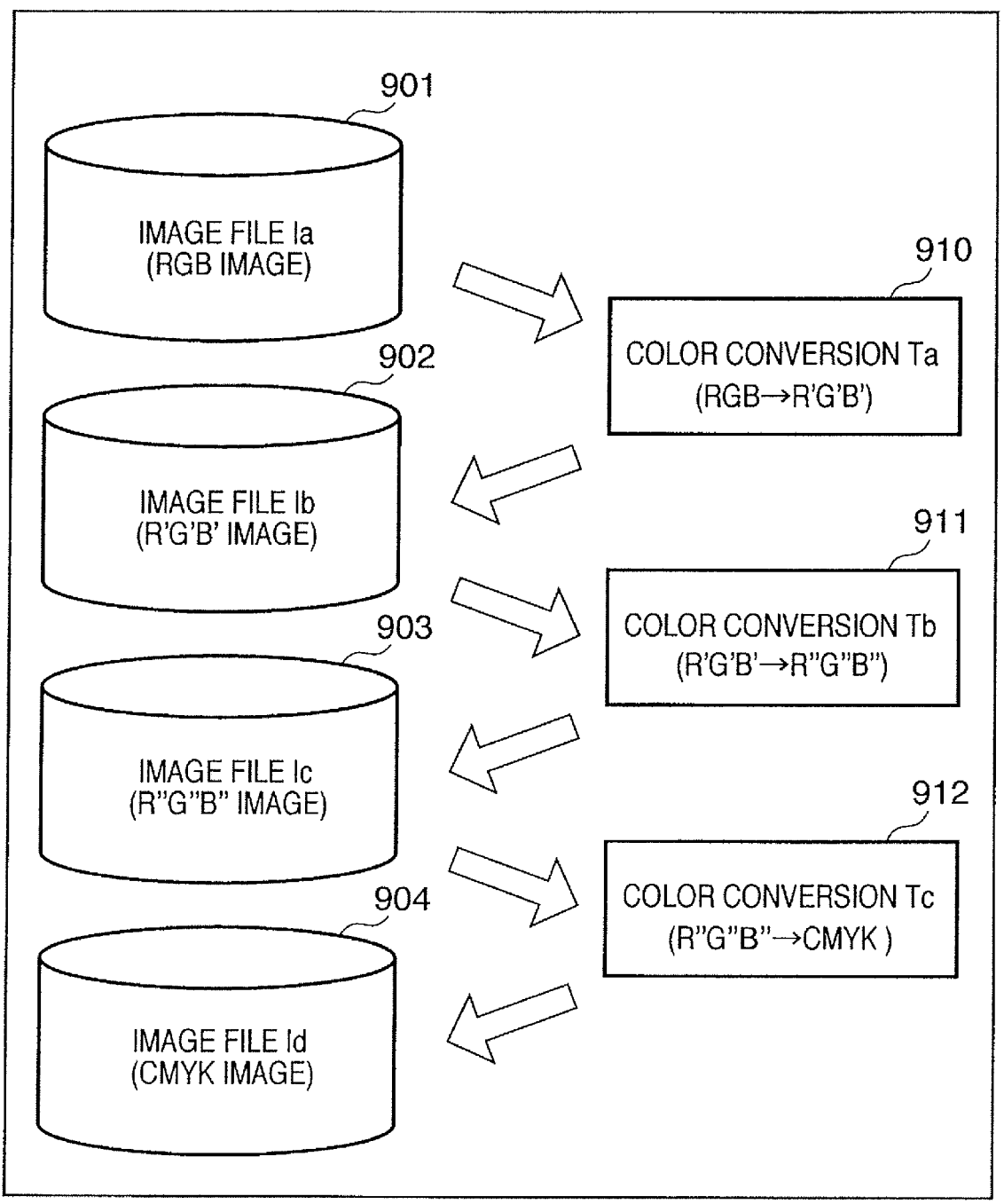
FIG. 9 shows an image processing order according to the first embodiment of the present invention.

FIG. 9 illustrates image processing in the PD printer 1000 used in the present invention.

The images that the PD printer 1000 receives are usually JPEG images. In this case, the pixel data that comprises the image is described in a color space that uses the expressions Y, Cb, Cr using luminance and color difference defined as recommended in ITU-R BT.601. As a result, although not shown a conversion to a color space expressed in terms of RGB is carried out. The color space-converted image is the image file Ia (901) shown in the drawing. If the PD printer 1000 receives an image other than a JPEG image, then the image may be in a space other than the YCbCr space. In this case, although not shown, a color space conversion to RGB space from the color space described in that file is carried out and an RGB image is obtained.

Next, the PD printer 1000 carries out a color conversion Ta (910). This color conversion is carried out based on the source profile received from the DSC 3012. In this color conversion, the conversion of color space is defined as a three-dimensional look-up table and is described in the source profile. The PD printer 1000 converts pixel values expressed in RGB space in the same RGB space according to the look-up table described in the source profile and obtains a converted image Ib (902). It should be noted that even after conversion it is still the same RGB expression, and therefore in FIG. 9 apostrophes are added and the result is written as "R'G'B' image". This conversion converts the image expressed in the color space dependent on the DSC 3012 into a general-purpose RGB space.

Next, the PD printer 1000 carries out a color conversion Tb (911). This color conversion is carried out based on the color profile received from the DSC 3012. In this color conversion also, the conversion of color space is defined as a three-dimensional look-up table and is described in the color profile. The PD printer 1000 converts pixel values expressed in RGB space in the same RGB space according to the look-up table and obtains a converted image Ic (902). In this process as well, even after conversion it is still the same RGB expression, and therefore in FIG. 9 apostrophes are added and the result is written as "R"G"B" image".

Finally, the PD printer 1000 carries out a color conversion Tc (912). This color conversion is a process that converts the image file Ic described in RGB space into a CMYK color space, CMYK being the colors of the ink of the PD printer 1000, and obtains an image Id. This color conversion, too, like the color conversions Ta and Tb described above, is carried out with reference to the look-up table. The look-up table used in this conversion, because it is a conversion that is dependent on the PD printer 1000, is not one received from the DSC 3012 but one that the PD printer 1000 itself stores.

Once the PD printer 1000 processes described above are finished, although not shown, the image Id is quantized and converted into dot discharge data, after which it is transmitted to the printhead in the PD printer 1000 and printed, by which an output image can be obtained.

It should be noted that although in the above-described embodiment RGB is described as the color space that is common to both image files between color conversions (image file Ib, image file Ic), this color space is not limited to RGB and may instead be, inter alia, XYZ, L*a*b.

Moreover, when using a general-purpose color profile as described above, the color conversions Ta, Tb conform to the color profile's specifications, and the color space after conversion also conforms to those specifications.

In this first embodiment, the source profile is also managed as a separate file from the image file. However, as a variation, the source profile may be managed in accordance with the image file. In such a configuration, by imbedding the source profile in the image file the source profile can be made subordinate to the image file. In this case, of the procedures shown in FIG. 7 described above, procedures 704, 705 may be omitted.

In addition, although in the first embodiment described above the color conversion by source profile is described as being carried out by the PD printer 1000, alternatively, such color conversion may be carried out by the DSC 3012. Color conversion by source profile is for the purpose of absorbing the DSC 3012 device dependency, and therefore this process may be carried out by either the DSC 3012 or the PD printer 1000 without interfering with the effect of the present invention.

Moreover, a variation in which conversion of the source profile is deliberately carried out at the DSC 3012 may be achieved in the following manner: Specifically, carry out image conversion corresponding to conversion by source profile in advance on the image file that the DSC 3012 is to transmit, and further, do not describe the source profile in the job file shown in FIG. 8. In other words, by carrying out in the DSC 3012 conversion from the DSC 3012 device-dependent color space to the standard color space in advance, the work of carrying out DSC 3012 device-dependent color conversion on the PD printer 1000 side can be omitted. Further, in order to show that the image to be transmitted is not dependent on the device characteristics of the DSC 3012, the source profile description shown in FIG. 8 is omitted.

In addition, deliberately causing color conversion based on the source profile to be carried out in the DSC 3012 on the printer side can be achieved in the following manner: Specifically, in step 1 of the two steps for confirmation in procedure 700, write that color conversion processing based on the source profile is not to be carried out by the PD printer 1000.

Executing color conversion by source profile at the DSC 3012 in this manner has the advantage that the amount of data to be transmitted and received can be reduced by an amount equivalent to the source profile. Further, where color conversion processing can be carried out faster at the DSC 3012 than at the PD printer 1000, a reduction in processing time can be expected as well.

Further, in the first embodiment described above color conversion is described as being implemented in two stages, that is, color conversion from the DSC 3012 color space to a general-purpose color space in accordance with the source profile and color conversion that reflects user preferences within the general-purpose color space in accordance with the color profile. Alternatively, these two conversion processes may be combined in a single conversion that reflects user preferences. In that case, in the DSC 3012 the conversions of the source profile and the color profile are combined in a single conversion and stored as a color profile, which enables procedure 704 and procedure 705 of the procedures shown in FIG. 7 to be omitted, and further, enables the color conversion 910 of FIG. 9 to be omitted as well.

Moreover, in the first embodiment described above, a job file and the source profile, the color profile, and the image file are described independently with different tags, with the tags of the latter four being in the form of linkage to the job file. Alternatively, the image file may be linked to the job file, and the source profile and the color profile linked and described within the image file. As the procedure in this case, the PD printer 1000 having received the job file analyzes its content and receives the image file. Next, the PD printer 1000 analyzes the image file and from its content obtains information relating to the source profile and the color profile, and on the basis of that information receives the source profile and the color profile from the DSC 3012. In this configuration as well, because the image file, the source profile, and the color profile are each managed independently in the DSC 3012 it is not necessary to prepare a source profile and a color profile for every image file, which makes possible the effect of the present invention, namely, easing the burden of storing the color profile on the digital camera side.

Further, the source profile may be imbedded in the image file. In that case, in step 2 of the two steps for confirmation in procedure 700, transmission and reception in a format in which the source profile is imbedded in the image is determined between the DSC 3012 and the PD printer 1000. Further, the description relating to the source profile in the job file shown in FIG. 8 is omitted. Moreover, the same thing can be accomplished by imbedding in the description relating to the source profile in the job file shown in FIG. 8 a command that means "use the profile imbedded in the image file". In this case, although the burden associated with transmission and reception of the source profile increases, because the process for the color profile is the same as that in the first embodiment described above the same effect can be expected.

The first embodiment described above can implement user preferences and enable sensed images to be corrected, and at the same time eases the burden of storing a color profile for every image file on the digital camera side. Moreover, because the amount of data transmitted between the digital camera and the PD printer can be reduced, transmission time can be shortened.

In addition, conversion according to the source profile as described above produces description in a general-purpose color space, and therefore the image file Ib shown in FIG. 9 becomes an image file described in the general-purpose color space. As a result, with image files sensed with different types of DSC as well, device-type-dependency disappears once these files are converted into the image file Ib. Consequently, color conversion for the purpose of reflecting user preferences indicated by the color conversion Tb shown in FIG. 9 can be defined as a conversion that is independent of the type of DSC. Therefore, since a color profile for common color conversion can be used for image files Ib sensed with different DSC, the PD printer can be requested to carry out the same color conversion for all image files Ia no matter from which DSC they are acquired. However, when combining the source profile and the color profile in a single conversion as described above, because the source profile and the color profile are described in the same profile this effect cannot be expected.

Second Embodiment

Next, a description is given of a second embodiment of the present invention. Here, by requesting of the PD printer 1000 print processing in a plurality of color profiles, an environment is provided in which the user is able to select which color profile best matches his or her own preferences. Further, a description is given of achieving a drastic reduction in communication overhead between the DSC 3012 and the PD printer 1000 in the series of tasks using a simple configuration.

Figure 10:
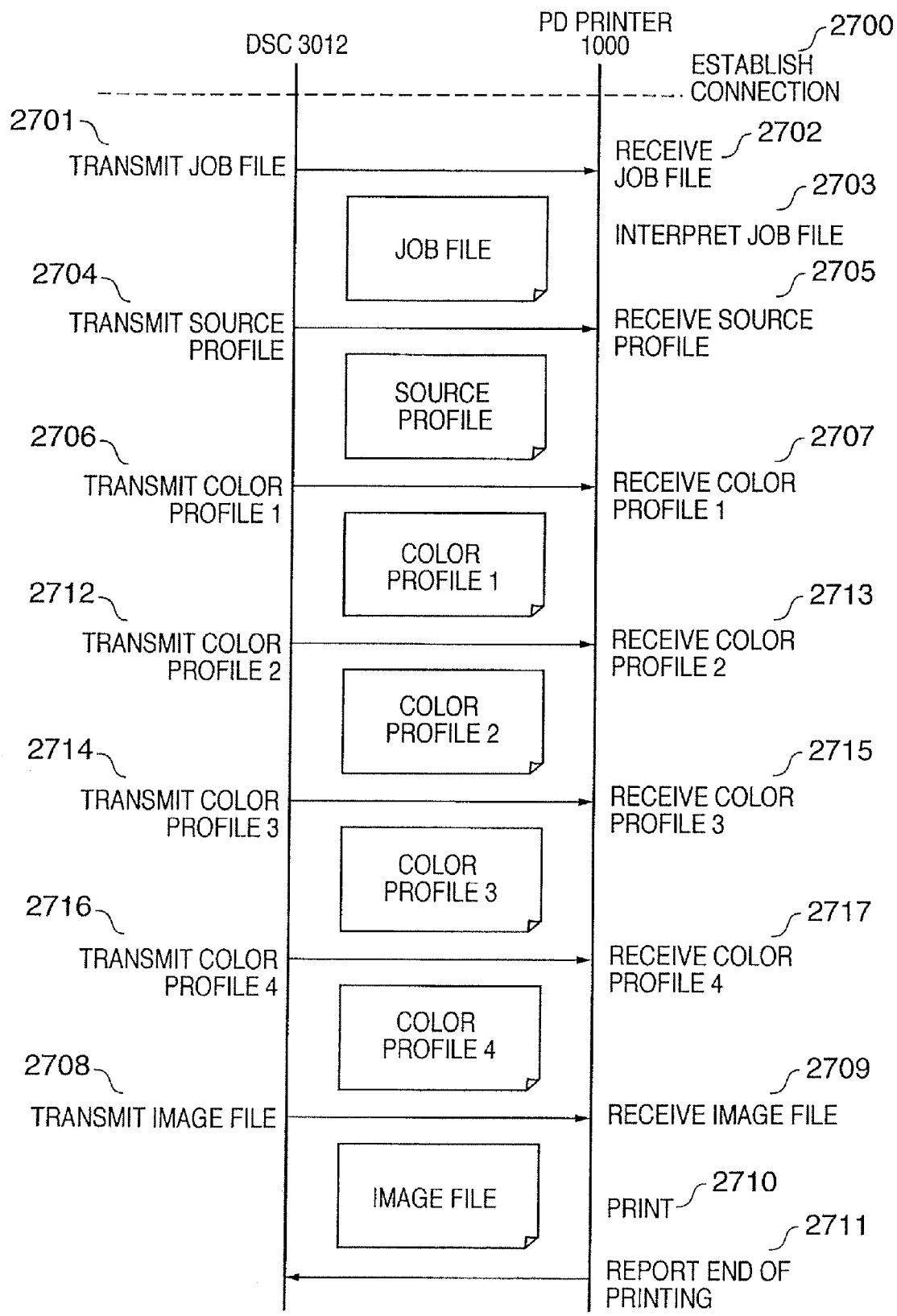
FIG. 10 shows an overall processing procedure of the digital camera and the PD printer according to a second embodiment of the present invention.

First, a description is given of the overall processing flow using FIG. 10.

As with the first embodiment, after the user physically establishes a connection between the DSC 3012 and the PD printer 1000, the DSC 3012 and the PD printer 1000 establish a logical connection (procedure 2700).

Next, the user sets the image file to be printed, the color profile, output medium size, output medium type, whether or not to print the date and so forth, and confirms printing. At this point, in the second embodiment, the user selects a plurality of color profiles. Further, in order to obtain multiple image output, the user changes the layout. When outputting a single image on a single sheet of recording media a 1UP layout is described, and therefore the layout is the same as that in the first embodiment. However, when outputting a plurality of images on a single sheet of recording media a multiple-UP layout is specified. In accordance with these user operations the DSC 3012 creates a job file and transmits it to the PD printer 1000 (procedure 2701).

The PD printer 1000 receives the job file (procedure 2702) and analyzes it (procedure 2703). Details of the job file are described later.

Next, the PD printer 1000 receives from the DSC 3012 the source profile described in the job file (procedures 2704, 2705) and the color profiles as much as described in the job file. In the second embodiment, four types of color profiles are received (procedures 2706, 2707, 2712-2717).

After transmission and reception of the color profiles is finished, the image file is received from the DSC 3012 (procedure 2709). The PD printer 1000 creates a layout according to the job file described above, and carries out image processing described below in accordance with the source profile, color profiles, and image file, and carries out a printing operation (procedure 2710).

After the printing operation ends, the PD printer 1000 informs the DSC 3012 of the end of printing (procedure 2711) and ends the series of printing operations.

Using FIG. 11, a description is now given of the content of the print job file that is transmitted from the DSC 3012 to the PD printer 1000.

The difference between the first embodiment and the second embodiment is the specification of the layout of the part that describes the capability and the profile part. The capability difference is that a 4UP layout that arranges four images on a single sheet of recording media for carrying out image printing of the color profile portion is specified. The profile difference is that multiple color profiles are transmitted and received.

Other than the part for performing the layout, the image processing is the same as that of the first embodiment, and therefore a description thereof is omitted.

Figure 12:
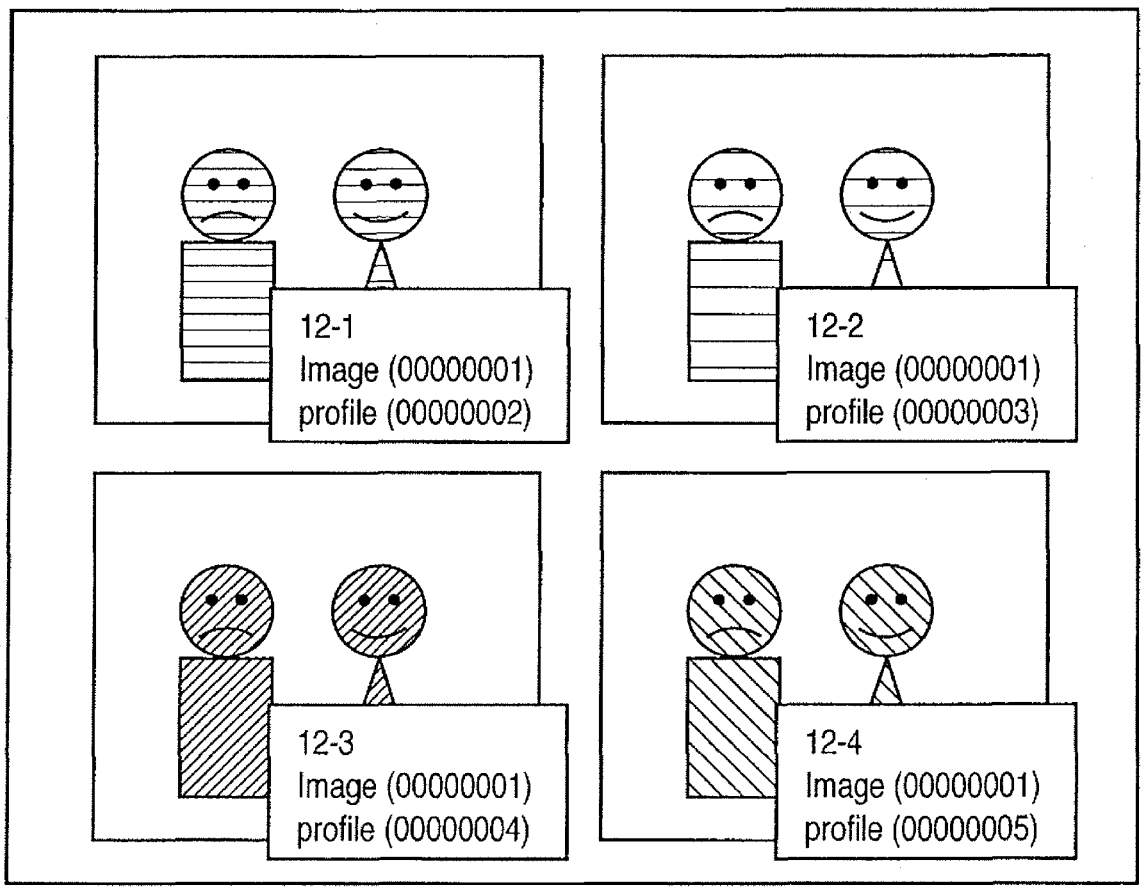
FIG. 12 shows an example of output results according to the second embodiment of the present invention.

An example of the output result as a result of the layout is shown in FIG. 12. As shown in this drawing, image processing is carried out according to the settings of the color profiles of four types, and four images are laid out on a single sheet of output media and output. In the example shown in FIG. 12, an output image (12-1) that is the result of color conversion processing according to a color profile (00000002) of an image (00000001) is printed in the upper left of the output media. In addition, an output image (12-2) that is the result of color conversion processing according to a color profile (00000003) of the image (00000001) is printed in the upper right of the output media, an output image (12-3) that is the result of color conversion processing according to a color profile (00000004) of the image (00000001) is printed in the lower left of the output media, and an output image (12-4) that is the result of color conversion processing according to a color profile (00000005) of the image (00000001) is printed in the lower right of the output media.

It should be noted that, in the second embodiment, a description is given of processing a single image based on multiple color profiles by transmitting from the DSC 3012 a plurality of color profiles for one image, and printing the processed images. In the second embodiment, further, a plurality of images and a plurality of color profiles may be transmitted, and images printed in numbers equal to the number of combinations of images and profiles. As an example, consider a case of transmitting m image files of average file size P and n color profiles of average file size Q. If the color profiles are imbedded in the image files, then the amount of data transferred is:

$$P \times (m \times n) + Q \times (m \times n)$$

By contrast, if the image files and the color profiles are transmitted independently as in this second embodiment, the following amount of data is sufficient:

$$(p \times m) + (Q \times n)$$

Thus, the data transfer amount can be sharply reduced. Therefore, the data transfer time from the DSC 3012 to the PD printer 1000 can also be reduced.

Thus, as described above, the second embodiment, in addition to obtaining the same effect as the first embodiment, also enables the user to compare the output results of processing the same image with a plurality of different color profiles, thus enabling the user to determine with ease the color profile of the user's own preference.

Third Embodiment

Next, a description is given of a third embodiment of the present invention. In the third embodiment, an environment is provided in which, by requesting that the PD printer 1000 print multiple images for a single color profile, a color profile that is once received is saved and printing of a plurality of images is carried out. Further, a description is given of reducing communication overhead between the DSC 3012 and the PD printer 1000 as much as possible with a simple configuration, because the color profile may be sent once when printing the plurality of images.

First, a description is given of the job file using FIG. 14.

The difference between the first embodiment and the third embodiment is that multiple image files are specified. In the job file, the color conversion specified by a single color profile is applied to a plurality of image files so as to obtain multiple image output. As a result, four image files described in the job file are color-converted and output according to the same color profile.

Figure 13:
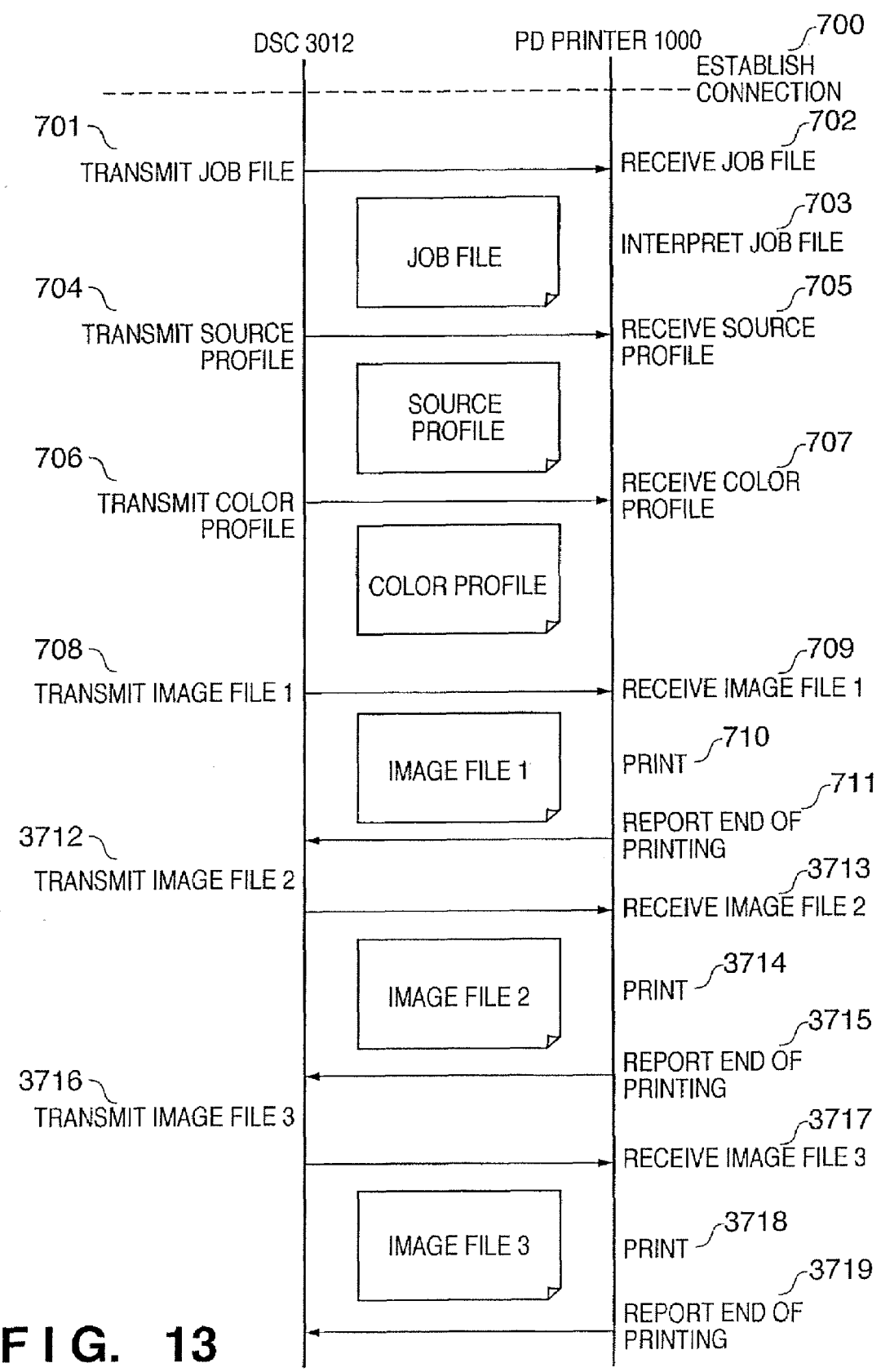
FIG. 13 shows an overall processing procedure of the digital camera and the PD printer according to a third embodiment of the present invention.

Next, a description is given of the overall processing flow with reference to FIG. 13. It should be noted that, in FIG. 13, procedures that are the same as those shown in FIG. 7 are assigned the same reference numerals and descriptions thereof omitted. However, in the third embodiment, the user selects a plurality of image files when setting the image file to be printed, the color profile, output medium size, output medium type, whether or not to print the date and so forth, and confirming printing.

Up to the acquisition of a single sheet of image output (from procedure 700 to procedure 711) the process is the same as that of the first embodiment. Once the PD printer 1000 informs the DSC 3012 of the end of printing in procedure 711, the DSC 3012 receives notification of the end of printing of a first-page image and transmits to the PD printer 1000 a second-page image file (procedures 3712, 3713). The PD printer 1000 carries out color conversion of the second-page image file using the same color profile as that used for processing the first-page image file and outputs the second-page image (procedure 3714). Here, the request for the second-page image file from the PD printer 1000 is generated upon a command notifying a completion of reception of the first-page image file, and therefore, besides the DSC 3012 first-page image output completion, another image file reception request command may be defined and used. After printing ends the PD printer 1000 informs the DSC 3012 of the end of printing (procedure 3715). As with the second page, the DSC 3012 then transmits an image file for carrying out printing of a third page (procedures 3716, 3717). The PD printer 1000 then carries out printing of the received image data (procedure 3718). After printing of the third page is finished the PD printer 1000 informs the DSC 3012 of the end of printing (3719), and the DSC 3012, recognizing the completion of all printing operations, ends the series of operations.

As an example, consider a case in which m image files of average file size P and a color profile of file size Q are transmitted. If the color profile is imbedded in the image file, then the amount of data to be transmitted is:

(P+Q)×m

By contrast, if the image files and the color profile are transmitted independently as in this third embodiment, the following amount of data is sufficient:

(P×m)+Q

Thus, the data transfer amount can be sharply reduced. Therefore, the data transfer time from the DSC 3012 to the PD printer 1000 can also be reduced.

Fourth Embodiment

Next, a description is given of a fourth embodiment of the present invention. In the fourth embodiment, the color profile that the PD printer 1000 receives from the DSC 3012 is stored in an area in which it can continue to be saved even after the connection to the DSC 3012 is severed, and the PD printer 1000 carries out color conversion using the saved color profile until a new color profile is transmitted from the DSC 3012. Such control enables the PD printer 1000 to carry out the same color conversion regardless of the type of DSC 3012.

First, a description is given of the job file using FIG. 16.

In the job file shown in FIG. 16 what is different from the job file shown in FIG. 8 of the first embodiment is a portion that clearly describes saving the source profile and the color profile transmitted from the DSC 3012. This portion is written in the <save_profile> in FIG. 16, and means "save" if its value is "0001" and "do not save" if its value is "0000". Although there is no command provided for clearly indicating how long the profile in question is to be saved, the PD printer 1000 interprets the transmission of a new profile as a command to discard the source profile and/or color profile it had been saving up to that point. Then, the PD printer 1000 discards the saved profile(s) and saves the new profile(s). Here, "do not save" means that the description pertaining to that profile is valid for a given job only and is saved until the completion of that job, but does not affect any other job. Similarly, "save" means to save for possible application to other jobs besides the job including this description.

In addition, when the PD printer 1000 saves the source profile it also stores the type of DSC 3012 connected. This is because the source profile has device-type dependency and individual unit-dependency, and the type of DSC 3012 is used as one criterion for determining whether or not the saved profile can be applied. Further, information on the type of device to be saved likely consists of two types of information: Information exchanged between the DSC 3012 and the PD printer 1000 when they are connected to each other and information relating to the DSC, used for sensing an image, that is imbedded in the image file. In the fourth embodiment, the PD printer 1000 does save the device type information provided by the DSC 3012, although it may of course use the device type information which is stored in the image file. With regard to the device type information that is stored in the image file, it is usually described in the EXIF format described above.

Figure 15:
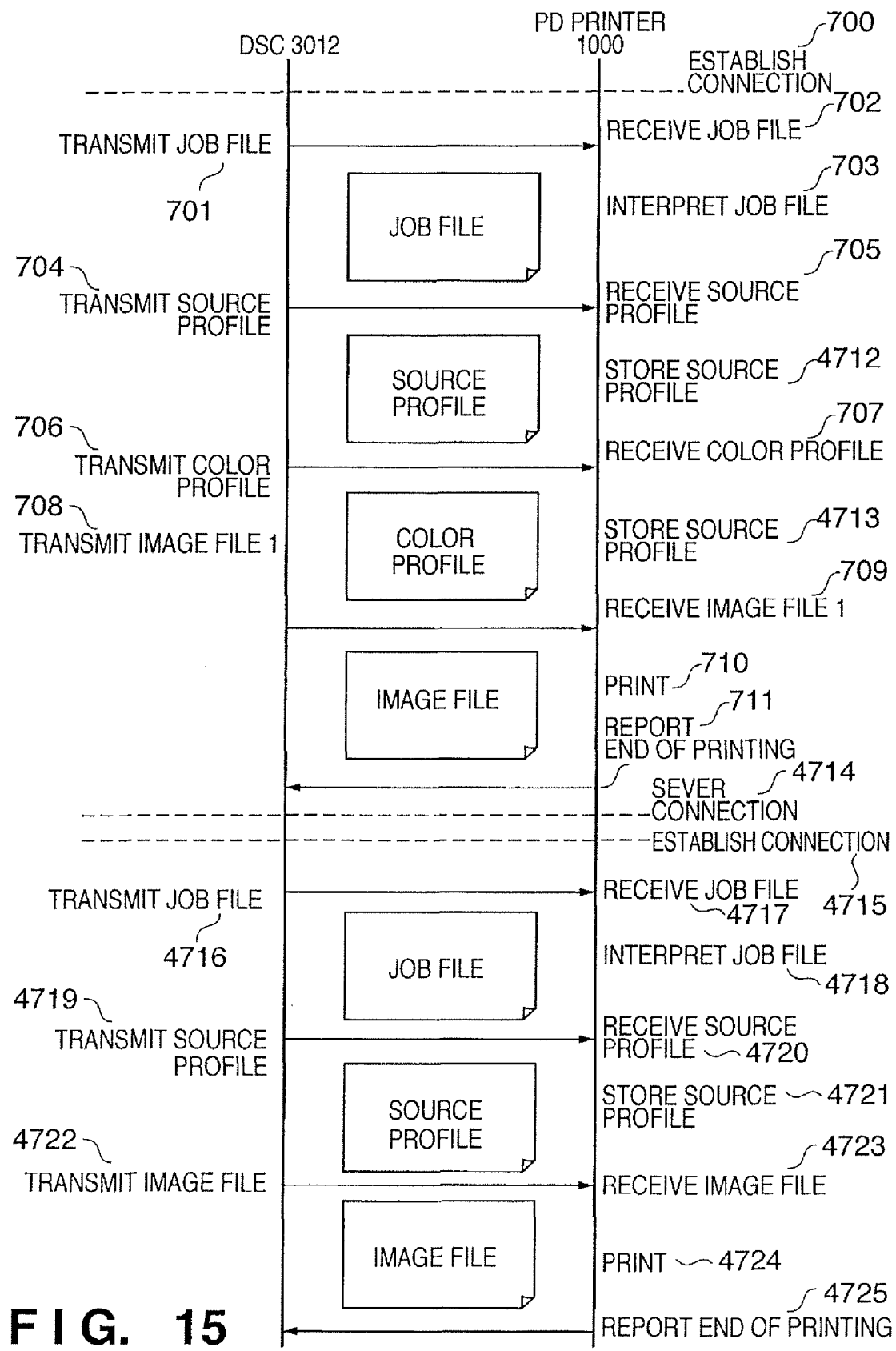
FIG. 15 shows an overall processing procedure of the digital camera and the PD printer according to a fourth embodiment of the present invention.

Next, a description is given of the overall processing flow with reference to FIG. 15. It should be noted that, in FIG. 15, procedures that are the same as those shown in FIG. 7 are assigned the same reference numerals and descriptions thereof omitted. Up to the transmission and reception of the job file (procedures 701-703) the process is the same as the procedures described in the first embodiment, and therefore descriptions thereof are omitted.

The PD printer 1000, after it interprets the job file, receives the source profile from the DSC 3012 (procedures 704, 705). In the job file example shown in FIG. 16, the tag <save_profile> relating to the source profile in the job file is "0001". In this case, the received source profile is saved in the nonvolatile memory 12 so that it can be retained even after the connection between the PD printer 1000 and the DSC 3012 is severed (procedure 4712). At this time, as described above, the device type information of the DSC 3012 is also saved. It should be noted that although in this fourth embodiment the source profile is saved in the nonvolatile memory 12 so that it can be retained even after the power supply is cut, alternatively the source profile may be saved in the RAM 3 so that it can be retained even after the connection is severed.

Next, the PD printer 1000 receives the color profile (procedure 707). In the example shown in FIG. 16, the tag <save_profile> that relates to the color profile in the job file is "0001". In this case, the PD printer 1000 saves the received color profile in the nonvolatile memory 12 so that the color profile can be retained even after the connection between the DSC 3012 and the PD printer 1000 is severed (procedure 4713).

Finally, as in the first embodiment the PD printer 1000 receives the image file (procedure 709), carries out a printing operation (procedure 710), and, after printing of the first page ends, informs the DSC 3012 of the end of printing (procedure 711).

Thereafter, the operator severs the connection between the DSC 3012 and the PD printer 1000 (procedure 4714).

Next, after once again establishing a connection between the DSC, different from the DSC used previously, and the PD printer 1000 (procedure 4715), the DSC sends and the PD printer 1000 receives the print job shown in FIG. 17 (procedures 4716, 4717). In this case, because the DSC is different from the previous one, this print job is a job file in which the device-dependent source profile is described but the color profile that reflects user preferences is not set.

The PD printer 1000, having received the above-described job file, interprets it (procedure 4718) and receives the source profile (procedure 4719, 4720). At this point, the PD printer 1000 determines whether or not it should replace the source profile saved in the previous connection procedure 4712 with the newly received source profile. In this case, because the DSC device type information is different, the PD printer 1000 discards the source profile saved previously and saves the newly received source profile (procedure 4721). At this time, the PD printer 1000 may inform the user which source profile should be used through the user interface.

After saving the source profile, the PD printer 1000 receives the image file (4722, 4723). At this point, because the color profile is not set in the job file shown in FIG. 17, the PD printer 1000 carries out color conversion using the previous color profile saved in the memory, and carries out printing (procedure 4724). Of course, the user may be informed that the color profile is not described using the PD printer 1000 user interface. In that case, the user may be allowed to decide whether to proceed with printing without using a color profile or to proceed with printing using a previously stored color profile.

After printing ends, the PD printer 1000 informs the DSC 3012 of the end of printing (procedure 4725) and ends the series of operations.

Moreover, the saved profile can be discarded using the user interface of the PD printer 1000.

As described above, according to the fourth embodiment, by using the same color profile printing results that reflect the same preferences of the user can be obtained even when using different DSC.

It should be noted that although the PD printer 1000 carries out conversion from the DSC device-dependent RGB color space described in the source profile to the standard color space based on the source profile, this color conversion process may be carried out by the DSC 3012 as well. In that case, the descriptive portion relating to the <source_profile> of the job file is omitted and the color conversion Ta in FIG. 9 is executed at the DSC 3012.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-218979, filed on Aug. 10, 2006, which is hereby incorporated by reference herein in its entirety.

What is claimed is:

1. A transfer method for transferring data between an image input apparatus and an image output apparatus in direct communication with each other, the image input apparatus being configured to store at least one image file of an input image and a conversion file including conversion information used for carrying out color conversion in a preset color space common to the image input apparatus and the image output apparatus, said transfer method comprising:

a first transfer step of transferring from the image input apparatus to the image output apparatus the conversion file for color conversion; and a second transfer step of transferring the image file from the image input apparatus to the image output apparatus after the conversion file is transferred in said first transfer step, wherein the image output apparatus carries out color conversion on the image of the image file transferred in said second transfer step using the conversion information included in the conversion file transferred in said first transfer step and generates a color-converted image corresponding to the conversion file, and wherein, in a case where M image files are transferred in said second transfer step after N conversion files are transferred in said first transfer step, wherein M and N are integers larger than 1, the image output apparatus carries out different color conversions of N types respectively corresponding to the N conversion files on each image of the M image files, thereby generating M×N color-converted images, wherein said transfer method further comprises a print control step of controlling to print the generated M×N color-converted images.

2. The transfer method according to claim 1, further comprising a storage step of storing in a memory unit the conversion file transferred in said first transfer step, wherein, when the conversion file is stored in the memory unit, the image output apparatus carries out color conversion of the image of the image file transferred in said second transfer step using the conversion information included in the conversion file stored in the memory unit.

3. The transfer method according to claim 1, wherein the image input apparatus further stores a color space conversion file that includes conversion information for converting an image of an image file from a color space of the image input apparatus to the preset color space common to the image input apparatus and the image output apparatus, wherein the transfer method further comprises a third transfer step of transferring the color space conversion file from the image input apparatus to the image output apparatus, and wherein the image output apparatus, after carrying out conversion of color space of the image of the image file transferred in said second transfer step using the conversion information included in the color space conversion file transferred in said third transfer step, carries out color conversion using the conversion information included in the conversion file transferred in said first transfer step.

4. The transfer method according to claim 1, further comprising a fourth transfer step of transferring a job file that reports transfer of the conversion file and the image file from the image input apparatus to the image output apparatus.

5. The transfer method according to claim 1, wherein the plurality of color-converted images are output to the user by being printed.

6. The transfer method according to claim 5, wherein the plurality of color-converted images are output to the user by being printed on a single recording medium sheet.

7. An image output apparatus comprising:
a communication unit configured to communicate directly with an external image input apparatus;
a control unit configured to receive from the image input apparatus through said communication unit at least one image file and at least one conversion file that includes conversion information for carrying out color conversion in a preset color space common to the image input apparatus and the image output apparatus;
a color conversion unit configured to carry out color conversion of an image of the received image file using the conversion information included in the conversion file and generate a color-converted image corresponding to the one conversion file;
an output unit configured to output the color-converted image generated by said color conversion unit; and
a memory unit configured to store the conversion file received from the image input apparatus,
wherein, in a case where M image files are received after N conversion files are received, wherein M and N are integers larger than 1, said color conversion unit carries out different color conversions of N types respectively corresponding to the N conversion files on each image of the M image files, thereby generating M×N color-converted images,
wherein said image output apparatus further comprises a print control unit configured to control to print the generated M×N color-converted images.

8. The image output apparatus according to claim 7, further comprising:
a second control unit configured to receive from the image input apparatus a color space conversion file that includes conversion information for converting an image of an image file from a color space of the image input apparatus to a preset color space common to the image input apparatus and said image output apparatus; and
a color space conversion unit configured to carry out color space conversion of the image of the received image file using the conversion information included in the color space conversion file,
wherein after the color space conversion unit carries out color space conversion on the image of the received image file using the conversion information included in the color space conversion file received by said second control unit, said color conversion unit carries out color conversion using the conversion information included in the conversion file received by said control unit.

9. The image output apparatus according to claim 7, wherein said control unit is further configured to receive a job file indicating transfer of the conversion file and the image file, and
wherein said control unit is configured to receive the image file and the conversion file based on said received job file.

10. A transfer method for transferring data between an image input apparatus and a printer in direct communication with each other, the image input apparatus being configured to store at least one image file of an input image and a color conversion file including conversion information used for carrying out color conversion in a preset color space common to the image input apparatus and the printer, said transfer method comprising:
a print job transfer step of transferring from the image input apparatus to the printer a print job file describing information for designating an image to be printed;
a first transfer step of transferring from the image input apparatus to the printer the color conversion file for color conversion; and
a second transfer step of transferring an image file, whose image is designated to be printed by the print job file, from the image input apparatus to the printer after the color conversion file is transferred in said first transfer step,
wherein the printer carries out color conversion of and outputs the image of the image file transferred in said second transfer step using the conversion information included in the color conversion file transferred in said first transfer step, and
wherein in a case where M image files are transferred in said second transfer step after N color conversion files are transferred in said first transfer step, wherein M and N are integers larger than 1, the printer prints out N images for each of the M image files that have undergone different color conversions of N types respectively corresponding to the N conversion files, thereby generating M×N color-converted images that are printed.

11. The transfer method according to claim 10, further comprising a third transfer step of transferring from the image input apparatus to said printer a color space conversion file describing information to convert color information depending on the image input apparatus to the preset color space before the image file is transferred in said second transfer step,
wherein the printer carries out color conversion based on the color space conversion file transferred in said third transfer step and then carries out color conversion based on the color space conversion file transferred in said first transfer step on an image file transferred in said second transfer step.

12. A printer comprising:
a communication unit configured to communicate directly with an external image input apparatus;
a control unit configured to receive from the image input apparatus through said communication unit a print job file describing information for designating an image to be printed, at least one image file, and a color conversion file that includes conversion information for carrying out color conversion in a preset color space common to the external image input apparatus and the printer;
a color conversion unit configured to carry out color conversion of an image of the received image file using the conversion information included in the conversion file;
an output unit configured to print out an image which is designated by the print job file after being color-converted by said color conversion unit; and
a memory unit configured to store the received conversion file,
wherein in a case where the control unit receives M image files after N color conversion files are received, wherein M and N are integers larger than 1, said output unit prints out N images for each of the M image files that have undergone different color conversions of N types respectively corresponding to the N conversion files, thereby generating M×N color-converted images that are printed.

13. The printer according to claim 12, wherein said control unit further receives from said image input apparatus a color space conversion file describing information to convert color information depending on said image input apparatus to the preset color space before the image file is received, and said color conversion unit carries out color conversion based on the color space conversion file describing information to convert color information depending on said image input apparatus to the preset color space, and then carries out color conversion based on the color space conversion file that includes conversion information for carrying out color conversion in the preset color space on an image file.

* * * * *